United States Patent [19]

Miyake et al.

[11] 4,042,385
[45] Aug. 16, 1977

[54] SINTERING METHOD FOR MAKING A HIGH CARBON FERROUS SLIDING ELEMENT

[75] Inventors: Kenji Miyake; Hiroshi Kumon; Yoshimaru Zitukane; Shigeru Akutagawa, all of Hiroshima, Japan

[73] Assignee: Toyo Kogyo Co., Ltd., Japan

[21] Appl. No.: 629,906

[22] Filed: Nov. 7, 1975

[30] Foreign Application Priority Data

Nov. 9, 1974 Japan .................................. 49-129326

[51] Int. Cl.$^2$ ................................................. B22F 3/00
[52] U.S. Cl. ........................................ 75/224; 75/221; 75/200; 148/126
[58] Field of Search .......................... 75/224, 221, 200; 148/126

[56] References Cited

U.S. PATENT DOCUMENTS

| 2,342,799 | 2/1944 | Goetzel ................................... 75/224 |
| 2,826,805 | 3/1958 | Probst et al. ............................ 75/224 |
| 2,827,407 | 3/1958 | Carlson et al. .......................... 75/224 |
| 3,891,473 | 6/1975 | Latva ..................................... 75/224 |

FOREIGN PATENT DOCUMENTS 647,278  12/1960  United Kingdom .................. 75/224

Primary Examiner—Brooks H. Hunt
Attorney, Agent, or Firm—Wenderoth, Lind & Ponack

[57] ABSTRACT

Sintering method which comprises two principal stages, which are a first stage wherein green compacts are sintered in a regular manner, and a second stage which immediately follows the first stage and wherein sintered compacts are held for a set time at a temperature which is elevated but is below sintering temperature and in carburizing gas, thereby diffusing required component into the compacts, for example carbon in the case of ferro-carbide compacts for use as sliding elements. Also according to the invention a sintering box may have formed therein holes of set size and distribution density thereby to permit efficient removal of lubricant if initially added to compacts.

12 Claims, 6 Drawing Figures

SINTERING METHOD FOR MAKING A HIGH CARBON FERROUS SLIDING ELEMENT

The present invention relates to a sintering method. More particularly the invention relates a sintering method for production of ferrous material having high carbon content and suited for employment as sliding material.

It is known conventionally to produce iron-system sintered mechanical parts by compression and compaction of an iron powder, produced by a reduction process for example, and mixed with a specific amount of carbon powder, in the form of graphite for example, thereby to produce green compacts for 10 to 30 minutes at a temperature of from 1100° C to 1150° C in a furnace in which there is an atmosphere which is intended to prevent oxidation, decarburization, or other undesired reaction and may be constituted by endothermic gas including $N_2$, $CO$, and $H_2$ for example, compacts normally being loaded into what are called sintering boxes which are carried through the furnace by suitable conveyor means. Sintered products produced by such a method are low in carbon, either because only a little carbon is included in the powder material prior to sintering thereof, or because, even if initial addition of a comparatively large amount of carbon is made, sintering according to conventional methods is such that it is accompanied by considerable decarburization, which taked place both during heating to sinter and during cooling of compacts which is effected immediately subsequent to sintering thereof. The structure of final products obtained by conventional methods is generally fine cementite and a considerably larger amount of ferrite in a pearlite matrix. Despite the fact that sintering otherwise presents many advantages in relation to use of raw material in various conditions and combinations and to production of parts having dimensions controlled to a high degree of precision, it has been found hitherto that, because of the low carbon content thereof and the abovenoted composition which is generally obtained, conventionally produced sintered products are unsuited to use as mechanical sliding elements for example as seal elements since their use as such elements results in undue wear of contacted surfaces.

Another disadvantage in conventional sintering methods relates to use of lubricants. To facilitate flow during compression and compacting of iron powder it is common practice to admix a lubricant such as zinc stearate for example. When green compacts produced are subsequently carried through a sintering stage in a conventional sintering box there is generally incomplete elimination or removal of the zinc stearate, which accumulates in the box and causes formation of large holes in the surface portions of compacts contacted thereby thus resulting in products having rough surfaces. In addition to this structure and carbon content of compact portion contacted by such residual zinc stearate are often different from those of uncontacted portions. For example it has been found that when green compacts formed from a mixture consisting of 97% iron powder and 3% graphite and having included therein an addition of 0.8% zinc stearate are sintered the carbon content of sintered compact portions which have contacted the zinc stearate residue have a carbon content of 3.2% while the carbon content of other portions is 2.8%.

It is accordingly a principal object of the present invention to provide a sintering method wherein carbon is restored to powder compacts subsequent to sintering thereof and there are produced powder products having a structure constituted principally by agglomerate cementite in a pearlite matrix and including less ferrite whereby such products are suited to use as sliding elements.

Another object of the invention is to provide a sintering method according to which green compacts are sintered while contained in sintering boxes having a construction permitting avoidance of undesired effects of lubricant which may be initially provided in powder mixture for production of sintered products.

A further object of the invention is to provide a sintering method permitting economical production of high-carbon iron sintered products on an industrial scale.

Yet another object of the invention is to provide a sintering method permitting production of sliding elements which causes reduced wear of surfaces of elements contacted thereby.

In accomplishing these and other objects there is provided according to the present invention a sintering method which is characterized principally by the fact that sintering comprises two main stages. In the first stage, which is referred to below as the 'primary treatment stage', and generally corresponds to regular sintering as effected in conventional methods, green compacts formed from iron powder containing 2–5% (by weight) carbon which are loaded in a sintering box, are sintered by being maintained for 10–60 minutes at a temperature in the range of 1000° C to the iron-carbon eutectic temperature. The second main stage, referred to below as the 'secondary treatment stage' is in direct continuation to the first stage and consists of holding the compacts for 10–30 minutes at a temperature in the range 800°–1000° C in the presence of a carburizing atmosphere, whereby carbon content of a required level is restored in the compacts, the compacts being cooled subsequent to completion of primary and secondary treatment thereof. The first stage may be preceded by a presintering stage, although this is not essential.

A second characteristic of the sintering method of the invention is that employment is made of sintering boxes in which there are formed a set number of holes having a set size and defining a proportionally larger open area than is the case in conventional sintering boxes and which help further efficiency of carburization during secondary treatment of compacts and also permit efficient escape and dispersion of lubricant when lubricant has been included in metallic powders to facilitate compaction thereof.

A better understanding of the invention may be had from the following full description thereof when read in reference to the attached drawings, in which FIG. 1 is a graph of temperature and carbon potential in a furnace for sintering of iron-system products according to conventional methods;

Figure 1:
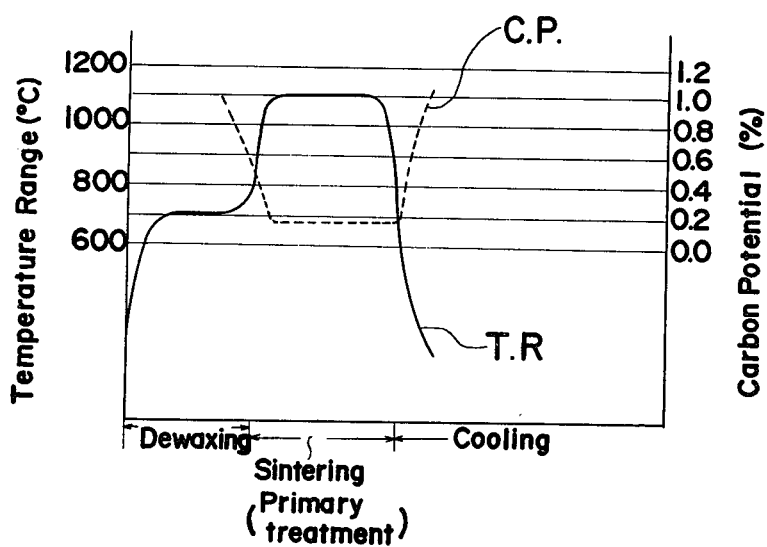

Iron powder for production of green compacts for sintering according to the method of the invention is powder which is produced by conventional reduction or atomization process, and the carbon mixed therewith is suitably in the form of natural or artificial graphite. If the mixture is simply an iron-carbon mixture, the proportion of weight of the iron powder is 98%-95% and that of the carbon powder 2-5%. If the proportion of the carbon powder is less than 2% cementite fails to be precipitated out to a sufficient amount in the sintered product, which is therefore liable to cause excessive wear of parts brought into sliding contact therewith and also to be the cause of seizure of sliding parts. Contrariwise, if the proportion of carbon is over 5%, the resultant sintered product is brittle, and in this case it is the sintered product which is liable to be unduly worn.

To improve mechanical strength and wear-resistance of a finished product, there may of course be blended in a mixture such as nickel, molybdenum or cobalt, which may be added in an amount up to 5% by weight. There may also be made a small addition, normally 0.5 – 1% by weight, of zinc stearate, lithium stearate or substance with similar properties, to act as a lubricant which facilitates compaction of the blended powder.

Compaction of such blended powder is effected by normal methods. For example the powder is subjected to a compaction pressure of 4–8 tons/cm$^2$, thereby to produce green compacts having a green density of 6.0 –6.8 g/cm$^3$.

According to the invention, a sintering box made of heat-resisting steel is employed for carrrying green compacts through the primary and secondary treatment stages. The sintering box resembles a sintering box employed according to conventional methods and so is of such a construction as to allow breathing. However, to meet the object of the invention, the sintering box is designed to maintain carburizing ability higher than that of the furnace. And further, the sintering box is positively provided with holes for removing easily zinc stearate during heating. In the case of not employing zinc stearate, it is not necessary to provide above-mentioned holes and desired result i.e., desired composition and structure, is obtained with a sintering box according to conventional methods. In the case of providing holes, hole size and distribution density thereof must be carefully selected. In the course of research it has been found that, when holes formed in a sintering box are round, if hole diameter is less than 2 mm melted lubricant accumulates in the box, with the resultant disadvantages noted above, whereas provision of holes having a diameter of over 6 mm permits undue influx into the box of gas constituting the atmosphere of the sintering furnace which normally have a carbon potential of 0.15 to 0.2%, with the result that it is not possible to maintain carbon potential of sintering box above 2.5%, resultant sintered products therefore being low in carbon and not having requisite qualities for use thereof as sliding elements. Thus hole diameter should be within the range 2 – 6 mm. Preferably, hole diameter is in the range 3 – 5 mm. With hole diameter in this range hole distribution density is suitably in the 25 – 100 holes/100 cm$^2$, hole distribution density being increased or decreased proportionally as hole diameter is decreased or increased. If density is less than 25 holes/100 cm$^2$ escape of lubricant from the box becomes difficult, while a density greater than 100 hole/100 cm$^2$ results in lowering of carbon content of sintered compacts. It is of course not essential for the purposes of the invention that holes formed in a sintering box be round, but the hole may be elliptical, square, rectangular or any other shape except very narrow slit, hole shape generally is selected with reference to ease of manufacture of sintering boxes.

If a lubricant such as zinc stearate is not added to the initial powder mixture sintered products having a required structure may be produced by the method of the invention regardless of whether sintering boxes having the abovedescribed construction or having a conventional construction.

Sintering of green compacts is effected by heating thereof in the presence of a carburizing atmosphere, which is suitably a endothermic gas generated from hydrocarbon such as methane, propane, or butane, and endothermic gas generated from butane being particularly preferred.

The green compacts are first heated at a temperature in the vicinity of 700° C and held at this temperature for 10 – 20 minutes, during which time added lubricant is dissociated and volatilized. This presintering stage may of course be omitted if no lubricant is added or if omission thereof is considered preferable from consideration of various aspects of the manufacture condition.

This presintering, if effected, is followed by primary treatment (i.e., regular sintering), which consists of raising temperature to a temperature in the range extending from 1000° C to the iron-carbon eutectic temperature. If the sintering temperature is lower than 1000° C there is insufficient diffusion of carbon in the green compacts and also insufficient bonding of particles of the green compacts with the result that the desired structure is not produced in the sintered products and the sintered products have low strength. Contrariwise, if the sintering temperature is exceeded over than the eutectic temperature of principal components the green compacts are melt with that required shape thereof cannot be maintained, and in this case also there is failure to produce desired structure in the sintered products. It is to be noted that the upper limit of temperature during primary treatment is the eutectic temperature of the principal components of the powder mixture. Duration of primary treatment is made longer or shorter as temperature is lower or higher and is suitable from 10 to 60 minutes.

Figure 2:
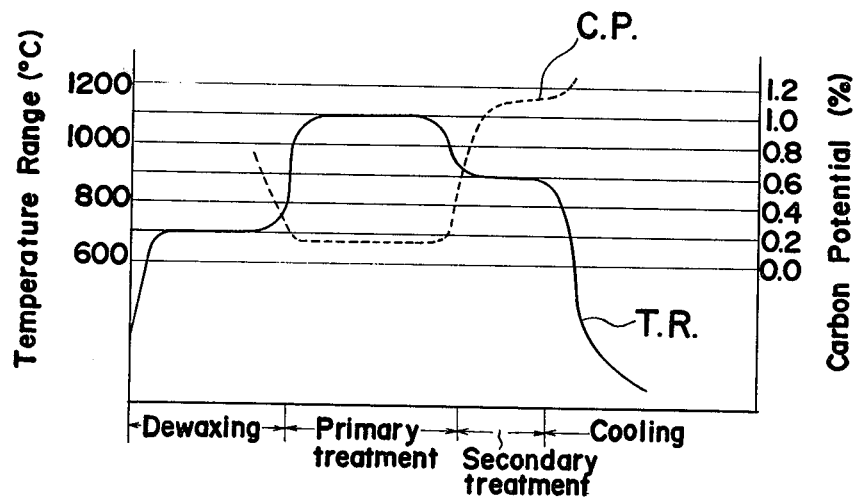
FIG. 2 is a graph of temperature in a furnace for sintering according to the method of the invention.

Primary treatment is followed immediately by secondary treatment in which the compacts are held for 10 – 30 minutes at a temperature in the range 800° – 1000° C. This secondary treatment has a considerable influence on eventual structure of sintered products. In FIG. 1 which graphs the temperature curve and carbon potential in a furnace of conventionally produced sintering method it is seen that, since sintered products are cooled immediately after regular sintering thereof (corresponding to primary treatment in the method of the invention), there is only a very narrow range in which carburization of, or more precisely restoration of carbon in, sintered products may be achieved with the result that final carbon content is low, final structure of conventionally produced products generally being a pearlite matrix containing fine cementite and a large amount of ferrite. In contrast to this, as may be seen from reference to FIG. 2, in the method of the invention, carburization of sintered products is allowed to proceed for a longer time, during the secondary treatment stage, in which carbon potential increases and carbon potential in the sintering box becomes to 2.5% or over.

Carbonization is thus allowed to react carbon being infiltrated into the sintered compact, with iron included in ferrite. Cementite is formed and grown to satisfactory degree around fine cementite being existent in the sintered compact, and at the same time ferrite is changed to perlite. The final structure obtained in sintered products being a pearlite matrix containing dispersed agglomerate cementite and very little ferrite as such, and having a carbon content of 2 - 5%.

It is of course not necessary that sintered compacts be maintained at a fixed temperature during secondary treatment thereof, but merely that they be held at a temperature in the abovenoted range. With reference to this range, if secondary treatment temperature exceeds 1000° C, carbon potential being low there is therefore insufficient carburization of sintered compacts. The temperature may be held at a temperature lower than 800° C, but in this case, as carburizing speed is small, the secondary treatment stage must last for an excessively long time which is not commercially practical. From the point of view of process time and facility of temperature control the temperature range in secondary treatment of compacts is preferably 850° C to 950° C.

The duration of the secondary treatment stage obviously varies according to factors such as initial or required final carbon content, density or cross-sectional dimensions of compacts for example, but in general should be at least 10 minutes in order to achieve a degree, or depth, or carbonization to give sintered products suitable for employment as sliding elements. If secondary treatment lasts more than 30 minutes, there is excessive production of cementite, which precipitates out as a network along grain boundaries and results in undesirable brittleness of sintered products.

The sintering furnace employed may be of any type, a particularly suitable example being a mesh belt conveyor over which employs heat-resisting steel belt for example, and is equipped with temperature adjustment and control means. The secondary treatment zone is suitably defined, for example, by a construction of firebrick or similar material which is provided immediately adjacent or connecting to the exit of the sintering furnace, or is constituted by an exit end portion of the sintering furnace proper which is defined by suitable partition walls. Duration of treatment is suitably varied by varying the speed of travel of the belt conveyor or other transport means.

Sintered products obtained by the abovedescribed method of the invention have a total carbon content of 2.0 – 5.0%, 1.1 – 1.8% combined carbon and 0.9 – 3.2% free carbon, and testing thereof has shown that the products have good strength and wear-resistance and at the same time, when employed as sliding elements, cause reduced wear of a surface of element contacted thereby. The products thus present particular advantages when employed as parts, such as engine pistons requiring gas or oil seal property.

The invention will be further described below in reference to specific examples thereof.

In Example 1 described below green compacts did nor include addition of zinc stearate as lubricant and conventional sintering boxes not containing holes were employed, while in Example 2 the green compacts included addition of zinc stearate and sintering boxes having formed therein a suitable number and density of holes such as described above were employed.

EXAMPLE 1

1. Procedure

Figure 3:
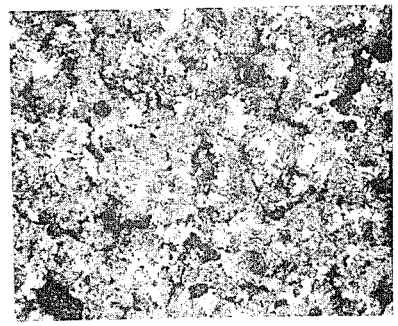
FIGS. 3 and 4 are microphotographs at a magnification of 115 showing structure of sintered products produced according to the method of the invention.

Green compacts having a green density of 6.6 g/cm$^3$ were produced from a mixture consisting of 96% by weight of reduced iron powder of commercial mill scale and 4% by weight of graphite having an average particle size of 4 μ, these components having been thoroughly mixed. These green compacts were placed in boxes each of which was able to contain several compacts and was 200 mm long, 200 mm wide and 30 mm deep, after which boxes were covered and transported by a mesh belt conveyor through a furnace in which the green compacts were sintered. Atmosphere employed in the sintering furnace was an endothermic gas generated from butane whose composition, by volume, was 30.5% $H_2$, 45% $N_2$, 23.8% CO, and 0.1% $CO_2$, the remainder consisting of impurities. Treatment of the green compacts consisted of presintering for 15 minutes at 700° C followed by regular sintering, i.e., primary treatment according to the invention, for 15 minutes at 1100° C, and then secondary treatment, which consisted of holding the compacts at 900° C for 10 minutes. The compacts were then cooled, whereby there were obtained sintered products which are shown in the microphotograph of FIG. 3 referred to above. These sintered products had a total carbon content of 3.83%, combined carbon 1.62%, free carbon 2.21%, tensile strength thereof was 26 kg/cm$^2$ and hardness thereof $H_RB$ 62.

2. Structure

Structure of sintered products produced by the abovedescribed method is shown as an enlargement of 115 times in the abovementioned microphotograph of FIG. 3. In the photograph, black portions are pores, grey-black portions are pearlite, and white portions are cementite. It is seen that agglomerate cementite is dispersed in a matrix of fine pearlite.

3. Carbon content and mechanical characteristics

Making variation for the carbon in the green compacts, i.e., for the added graphite only, carbon content and mechanical characteristics of sintered compacts obtained by the abovedescribed method are as shown in Table 1.

Table 1

| Carbon included in green compacts | Sintered/compacts | | | | |
|---|---|---|---|---|---|
| | Total carbon content | Combined carbon content | Free carbon | Tensile strength kg/cm$^2$ | Hardness $H_RB$ |
| 2 % | 1.90 % | 1.45 % | 0.45 % | 35 | 73 |
| 3 % | 2.89 | 1.53 | 1.36 | 30 | 68 |
| 4 % | 3.83 | 1.62 | 2.21 | 26 | 62 |
| 5 % | 4.82 | 1.71 | 3.11 | 21 | 58 |

4. Tests

Sintered products obtained by the abovedescribed method were machine to form solid cylinders each having a diameter of 10 mm and a length of 10 mm. Each cylinder was employed as a sliding element and tested as follows. A pushing force of 2 kg was applied to press the cylinder with its outer periphery against a rotatably mounted cast iron disc (Vickers hardness value 200), the central, longitudinal axis of the cylinder being disposed at right-angles to the plane of rotation of the disc, and the disc was rotated at at peripheral speed of 5 m/second for 10 minutes after which maximum damage, in microns, was measured, values of results of tests being shown in Table 2, which also shows results of the same test effected on a conventional sliding element made of special cast iron, and known by the trade name of Tarkalloy.

In Table 2, 'sliding element (i.e., sintered product cylinder) wear depth' indicates maximum extent of wear along a radial line of a sliding element, disc 'indentation' is determined by measuring roughness of the outer peripheral surface of the disc contacted by a sliding element then indicating depth of indentation with respect to a reference surface, 'degree of seizure' indicates height to which material transferred due to adhesive wear stands above a reference surface.

Table 2

|  | Sliding element wear depth ($\mu$) | Cast-iron disc Indentation | Degree of seizure ($\mu$) |
|---|---|---|---|
| included carbon: 2 % | 40 | 11.0 | 5.0 |
| " 3 | 45 | 10.0 | 4.0 |
| " 4 | 50 | 8.0 | 3.2 |
| " 5 | 70 | 7.4 | 3.0 |
| Tarkalloy | 90 | 17.2 | 4.0 |

As is seen in Table 2, sliding element material produced in Example 1 is less subject to wear, and also causes less wear of contacted surfaces. It is also seen that increased carbon content in sliding elements results in increased wear of sliding elements but less wear of surfaces of elements contacted thereby.

EXAMPLE 2

1. Procedure

Green compacts having a green density of 6.6 g/cm$^3$ were produced by compaction of a powder mixture which was prepared by thoroughly blending a reduced iron powder produced of commercial mill scale and graphite powder (average paricle size, 4 $\mu$) in the proportions 97% by weight and 3% by weight respectively, and to which there was subsequently made a 0.8% by weight addition of zinc stearate. These green compacts were placed in boxes each of which was 200 cm long, 200 cm wide, and 30 cm deep and able to contain several green compacts. The boxes were then covered with a cover formed therein round holes which had a distribution density of 49 holes/100 cm$^2$ and each had a diameter of 3 mm and transported by mesh belt conveyor through a sintering furnace wherein there was an atmosphere constituted by an endothermic gas generated from butane whose composition, by volume, was 30.5% $H_2$, 45% $N_2$, 23.8CO and 0.1% $CO_2$. Treatment of the compacts consisted, in order, of presintering for 15 minutes at 700° C, primary treatment for 15 minutes at 1100° C, secondary treatment for 10 minutes at 900° C, then cooling. The sintered products obtained, whose composition is shown in the microphotograph of FIG. 4, had a total carbon content of 2.83%, 1.39% being combined carbon and 1.44% free carbon, tensile strength thereof was 30 kg/mm$^2$ and hardness thereof on the Rockwell B scale ($H_R B$) was 68.

2. Structure

Figure 4:
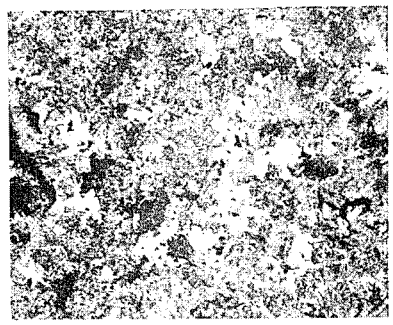

Structure of the sintered products is shown at a magnification of 115 in FIG. 4, in which black portions are pores, grey-black portions are pearlite, and white portions are cementite. It is seen that structure includes agglomerate cementite dispersed in a matrix of fine pearlite.

3. Tests

The products thus obtained were machined to form sliding elements each having the dimensions 10 × 10 × 10 × 10 mm. Each sliding element was pressed by a pressure of 30 kg/cm$^2$ against a cast-iron disc having a Vickers hardness value of 200, and while this pressure was maintained the sliding element and disc were moved in sliding contact at a relative speed of 7 m/second for 10 minutes, after which wear, in microns was measured, results being as shown in Table 3. For comparison, Table 3 also indicates wear of conventional sliding elements made of special cast-iron and known by the trade name of Tarkalloy and of sliding elements which were also tested in the same manner and that of decarburized sintered products which were produced in the same manner as the sliding elements of Example 2 except that sintering boxes were not employed. Each entry showing measured values in Table 3 indicates minimum and maximum values.

Table 3

|  |  | Sliding element wear depth ($\mu$) | Cast-iron disc indentation ($\mu$) |
|---|---|---|---|
| included carbon | 1 % | 16 – 30 | 2 – 7 |
| " | 2 | 9 – 25 | 0 – 6 |
| " | 3 | 18 – 25 | 0 – 2 |
| " | 4 | 24 – 40 | 0.5 – 3 |
| " | 5 | 38 – 42 | 0.5 – 2.5 |
| Tarkalloy |  | 14 – 41 | 1 – 4 |
| decarburized sintered products |  | 7 – 24 | 3 – 9 |

As in apparent from Table 3, decarburized sintered products cause a large amount of wear of cast-iron discs, whereas this wear is reduced when sintered products having carbon content in the range 2 – 5% are employed as sliding elements. However, it is also seen that with high carbon content wear of the sliding elements increases considerably.

4. Assessment

Hole diameter and distribution density in sintering boxes employed for transport of powder compacts of Example 2 were varied, and overall assessment of results obtained was made, assessments being summarized in Table 4 below, in which 0 indicated 'good', $\Delta$—fair, and x—poor.

Table 4

| hole dia. (mm) | distribution density (holes/100cm$^2$) | Assessment | Remarks for assessment |
|---|---|---|---|
| 1 | 100 | $\Delta$ | some blockage of holes |
|  | 50 | $\Delta$ | as above |
|  | 25 | x | blockage of many holes |
| 3 | 100 | 0 |  |
|  | 50 | 0 |  |
|  | 25 | 0 |  |
| 5 | 100 | $\Delta$ | slight decarburization |
|  | 50 | 0 |  |
|  | 25 | 0 |  |
| 7 | 50 | $\Delta$ | slight decarburization |
|  | 25 | $\Delta$ | slight decarburization |
| 10 | 50 | x | decarburization |
|  | 25 | x | decarburization |

Figure 5:
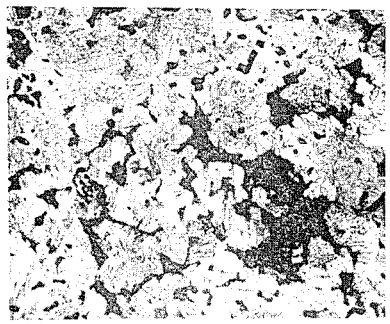
FIGS. 5 and 6 are similar in microphotographs showing examples of sintered product structure for comparison.
Figure 6:
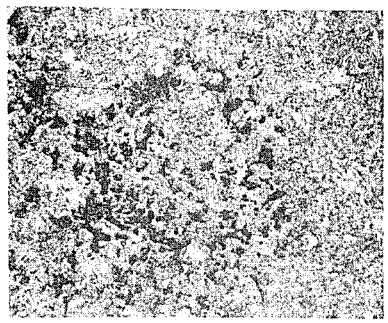

The microphotograph of FIG. 5, in which black portions are pores, grey-black portions are coarse pearlite, and white portions are fine cementite, shows structure of sintered product which had the same composition as green compacts of Example 2 (1) procedure, but where transported through a sintering furnace in conventional sintering boxes not having holes and received treatment in a sintering process in which temperature was as shown in FIG. 1. The microphotograph of FIG. 6 shows structure of sintered products produced in the same manner as those of Example 2 except that sintering box were not employed, i.e., structure of the products noted as 'decarburized sintered products' in Table 3. In the photograph, black portions are pores, grey-black portions pearlite, and white portions ferrite. During primary treatment there was considerable decarburization of the sintered compact from which these products were obtained due to exposure thereof to an atmosphere having a low carbon potential, and then, during secondary treatment carburization was insufficient since sintering boxes were not employed. As a result precipitation of cementite did not occur, and the overall structure of the products is constituted in entirety by uniform pearlite.

Needless to say, although the invention was described above in reference to production of high-carbon ferrous parts suitable for use as sliding elements, the sintering method of invention is not restricted to production of such parts, and secondary treatment of sintered compacts may be effected in an atmosphere for restoration or introduction of components other than carbon into sintered compacts, in accordance with original composition of the compacts and intended use thereof.

What is claimed is:

1. A sintering method for making a high-carbon ferrous sliding element which comprises:
    a. preparing a mixture of 2 to 5% by weight of carbon powder and the remainder being essentially iron powder;
    b. subjecting said mixture to a compacting pressure of 4 to 8 ton/cm$^2$, thereby to form a green compact;
    c. loading said green compact into a sintering box;
    d. placing said sintering box containing the green compact into a furnace box;
    e. heating said green compact within the furnace box for 10 to 60 minutes at an elevated temperature within the range of from 1000° C to eutectic temperature of the principal components of said green compact; and
    f. holding the thus-heated compact in said sintering box within the furnace box for 10 to 30 minutes at a temperature of 800° to 1000° C within said furnace box for the restoration of carbon which has been decarburized during said heating step (e), said sintering box serving to enhance the carburization of the compact within the furnace at least during the holding step.

2. A sintering method as claimed in claim 1, wherein said carburizing atmosphere is an endothermic gas generated from a hydrocarbon.

3. A sintering method as claimed in claim 2, wherein said endothermic gas is generated from butane.

4. A sintering method as claimed in claim 1, wherein said sintering box is provided with an opening having a permeable cross-area smaller than a predetermined value.

5. A sintering method as claimed in claim 1, wherein the temperature range of said holding step is 850° to 950° C.

6. A sintering method as claimed in claim 1, which further includes the step of adding a lubricant in an amount of 0.5 to 1.0% by weight to said mixture prior to application of said compacting pressure thereon, and wherein said sintering box is provided with openings which have a distribution density in the range 25 to 100 holes per 100 cm$^2$ and each of said holes has a diameter in the range of 2 to 6 mm.

7. A sintering method as claimed in claim 6, wherein the diameter of said openings is 3 to 5 mm.

8. A sintering method as claimed in claim 7, wherein said lubricant is zinc stearate.

9. A sliding element manufactured by the method as claimed in claim 1.

10. A sliding element manufactured by the method as claimed in claim 6.

11. A sintering method as in claim 1 wherein said furnace box has a carburizing atmosphere.

12. A sintering method as in claim 1 wherein the sintering box is made of heat-resistant steel.

* * * * *